US005560966A

United States Patent [19]

Kishimoto et al.

[11] Patent Number: 5,560,966

[45] Date of Patent: Oct. 1, 1996

[54] HIGH TENSILE STRENGTH FILM HAVING CONSTANT TEAR-DIRECTION

[75] Inventors: Hisao Kishimoto, Minami-Ashigara; Akifumi Hirata, Tokyo, both of Japan

[73] Assignee: Fuji Photo Film Co., Ltd., Kanagawa, Japan

[21] Appl. No.: 461,765

[22] Filed: Jun. 5, 1995

Related U.S. Application Data

[63] Continuation of Ser. No. 74,421, Jun. 10, 1993, abandoned.

[30] Foreign Application Priority Data

Jun. 26, 1992 [JP] Japan .................................... 4-169620

[51] Int. Cl.$^6$ .................................. B32B 3/10; G03C 3/00

[52] U.S. Cl. ............................ 428/43; 428/134; 428/135; 428/136; 430/501; 352/241

[58] Field of Search .............................. 428/43, 134–136; 430/501; 352/241

[56] References Cited

U.S. PATENT DOCUMENTS

| | | | |
|---|---|---|---|
| 1,222,925 | 4/1917 | Brewster | 430/501 |
| 2,118,519 | 5/1938 | Noack | 352/241 |
| 3,706,626 | 12/1972 | Smith et al. | 428/135 |
| 4,340,663 | 7/1982 | Mikawa et al. | 430/501 |

*Primary Examiner*—Alexander S. Thomas
*Attorney, Agent, or Firm*—Sughrue, Mion, Zinn, Macpeak & Seas

[57] ABSTRACT

A high tensile strength film has at least one small aperture or slit for tearing the film in a direction normal to a longitudinal direction of the film. The aperture has at least one apex which has an acute angle and is directed toward a direction normal to a longitudinal direction of the film. The aperture is in the form of a triangle, a polygon, an oval or a crescent moon.

9 Claims, 5 Drawing Sheets

HIGH TENSILE STRENGTH FILM HAVING CONSTANT TEAR-DIRECTION

This is a continuation of application Ser. No. 08/074,421 filed Jun. 10, 1993, now abandoned.

FIELD OF THE INVENTION

The invention relates to a high tensile strength film made of material such as polyester and, in particular, to a high tensile strength film which is adapted to be torn in a direction normal to the longitudinal direction of the film when tensile force greater than a certain limit is applied to the film.

BACKGROUND OF THE INVENTION

A film to be wound into a roll when used has conventionally been made of modified cellulose. In particular, cellulose triacetate (TAC) has been used for a film for movie because of its high clearness. A film has to have tensile strength greater than a certain strength because if a film has tensile strength smaller than the certain strength, the film is easily torn and thus it is necessary to join pieces of the torn film with each other. In general, a film has to have thickness thicker than 100 micrometers in order to have a tensile strength greater than the aforementioned certain strength.

However, a film having a thickness greater than 100 micrometers is bulky. Consequently a thin film made of high tensile strength polyester has been used these days in order to reduce bulk of a film while maintaining tensile strength greater than the certain limit.

However, there arises a new problem with use of a film made of high tensile strength polyester. Such a film is not easily torn even if high tensile force is applied to the film due to occurrences of film feeding jam. If the film is torn, a high load does effect the a machine for feeding the film. On the other hand, if high tensile strength film which is not easily torn is used, the film feeding machine may receive high load through the film when a film feeding jam occurs. This high load may cause a roller shaft of a developing device to deform. Alternatively the high load may act on a film itself to cause the film to be distorted over feet. In a latter case, it is necessary to remove distorted portions of the film and then join the remainder of the film. This work loses the advantages of use of a high tensile strength film.

SUMMARY OF THE INVENTION

It is an object of the present invention to solve the aforementioned problems. Specifically an object of the present invention is to provide a high tensile strength film which does not damage a film feeding device and the film itself even if high load is produced due to the occurrence of a film feeding jam.

The invention provides a high tensile strength film having at least one small aperture for introducing occurrence of tear of the film in effect the direction normal to effect the longitudinal direction of the film.

In a preferred embodiment, the film is provided with perforations for feeding the film which are formed along at least one of longitudinally extending edges of the film. The aperture is disposed between the adjacent perforations.

In another preferred embodiment, the aperture has at least one apex which has an acute angle and is directed toward the direction normal to the longitudinal direction of the film. The aperture is preferably in the form of one of a triangle, a polygon, an oval and a crescent moon. However, it should be noted that the apertures may take different forms from those forms. The acute angle of the apex is preferably in the range of 0 to 60 degrees.

Instead of the small aperture, a slit may be formed on the film. This slit extends in the direction normal to the longitudinal direction of the film. The slit is equivalent to a case where the acute angle of the apex is equal to zero degree.

In still another preferred embodiment, the film has a thickness in the range of 10 to 200 micrometers and is made of polyester, polyamide or polycarbonate.

The advantages obtained by the aforementioned high tensile strength film will be described hereinbelow.

When tensile force greater than a certain limit acts on a high tensile strength film in accordance with invention, the film is torn in the direction normal to the longitudinal direction of the film by virtue of the small aperture. This brings the advantages that high load does not act on a film feeding mechanism and/or the film is not distorted.

In a specific embodiment, the presence of the small aperture reduces tensile strength of a polyester film from the range of 1200 to 2000 kg/cm$^2$ to the range of 250 to 500 kg/cm$^2$ which corresponds to tensile strength of cellulose derivative.

The above and other objects and advantageous features of the present invention will be made apparent from the following description made with reference to the accompanying drawings.

DESCRIPTION OF THE PREFERRED EMBODIMENTS

Preferred embodiments in accordance with the invention will be explained hereinbelow with reference to drawings.

FIGS. 1 to 4 illustrates various high tensile strength films in accordance with the invention. A high tensile strength film 1 is made of various plastic films preferably including: cellulose derivative such as diacetyl acetate, triacetyl acetate, propionyl acetate, butanoyl acetate and acetylpropionyl acetate; polyamide; polycarbonate such as disclosed in U.S. Pat. No. 3,023,101; polyester such as disclosed in Japanese Publication (Kokoku) No. 48-40414 including polyethylene terephthalate, poly-1,4-cyclohexanedimethylene terephthalate, and polyethylene naphthalate; polystyrene; polypropylene; polyethylene; polysulfone; polyarylate; and polyeterimide. Among these materials, polyethylene naphthalate and polyethylene terephthalate are most preferable.

The high tensile strength film 1 may have a thickness preferably in the range of 10 to 200 micrometers, more preferably 70 to 100 micrometers.

The high tensile strength film 1 may have a width preferably in the range of 8 to 120 millimeters, more preferably 12 to 40 millimeters, most preferably 16 or 35 millimeters.

The high tensile strength film illustrated in FIGS. 1 to 4 has width "a" of 35 millimeters.

Figure 1:
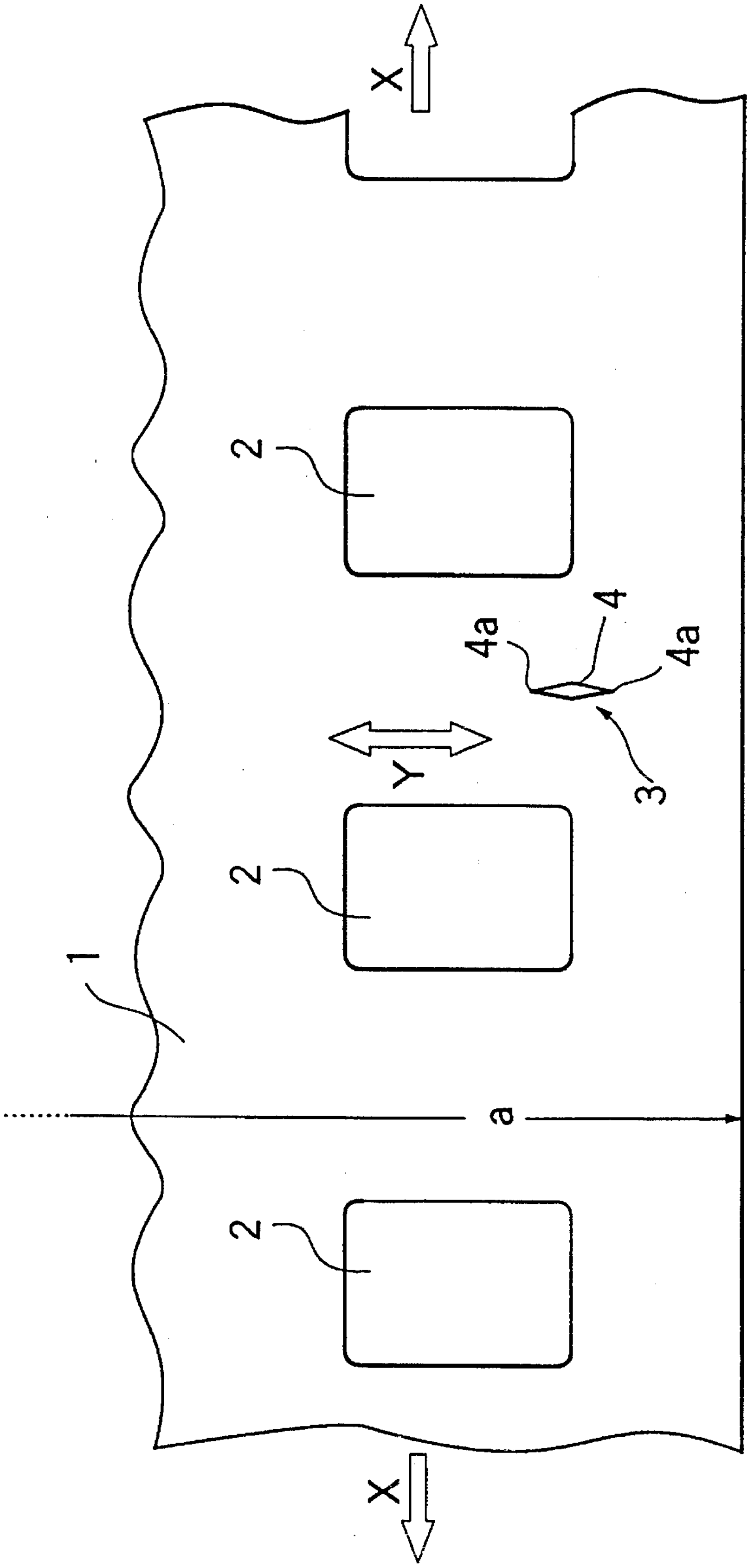
FIG. 1 is a top plan view illustrating an embodiment in accordance with the invention.

The high tensile strength film 1 extends in a direction indicated by "X" in FIG. 1 and is provided at one of a edges extending in the direction "X" with a series of perforations 2 at constant intervals. It should be noted that the perforations 2 may be formed at both edges extending in the direction "X". In addition, it should be noted that the perforations 2 may be arranged not only at constant intervals, but also at different intervals.

The high tensile strength film 1 may have a light sensitive layer (not shown) or printed or processed image layer (not shown) thereon. Furthermore, the high tensile strength film may be provided with a magnetic layer (not shown) for recording information about film production such as a date of production and/or a factory in which the film was produced and information about photograph-taking such as the date on which the photograph was taken and/or a flashlight to indicate that a light was used.

Figure 2:
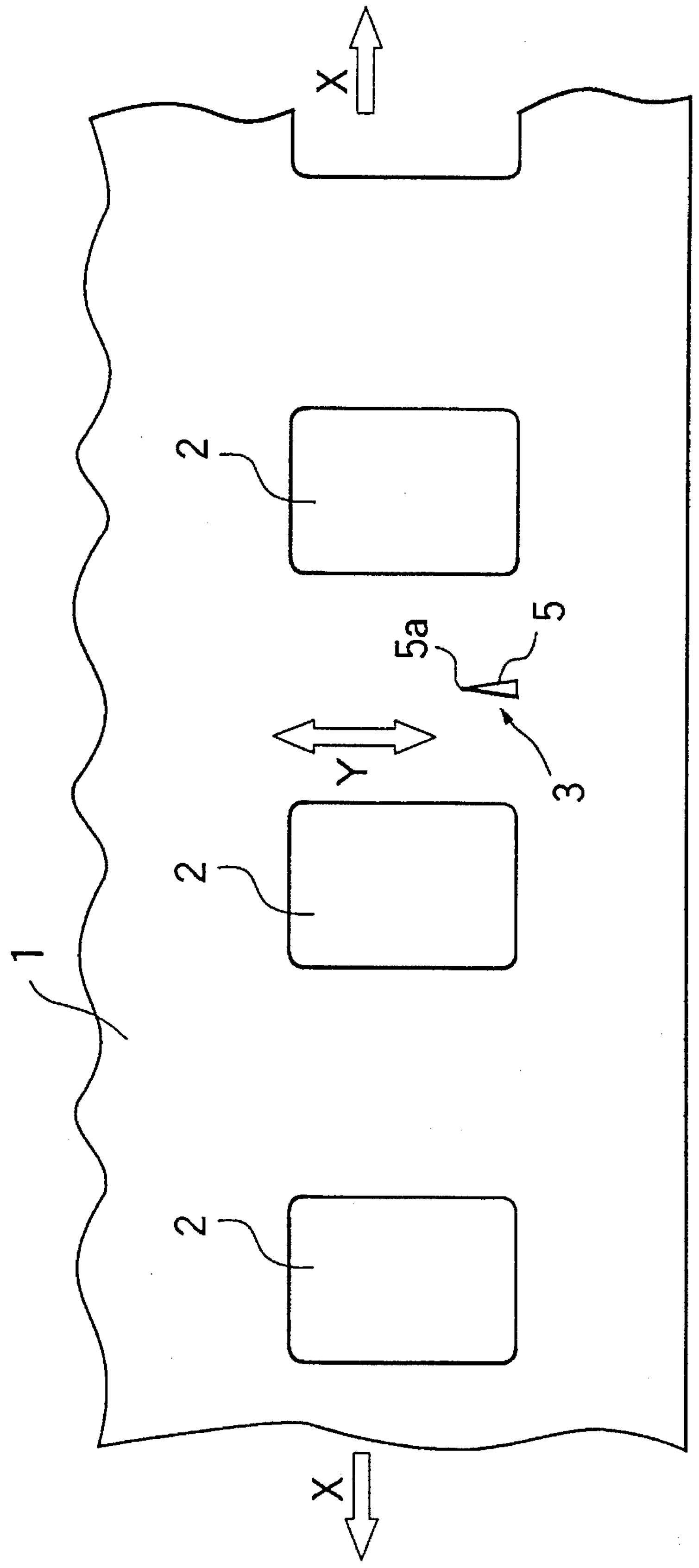
FIG. 2 is a top plan view illustrating another embodiment in accordance with the invention.
Figure 3:
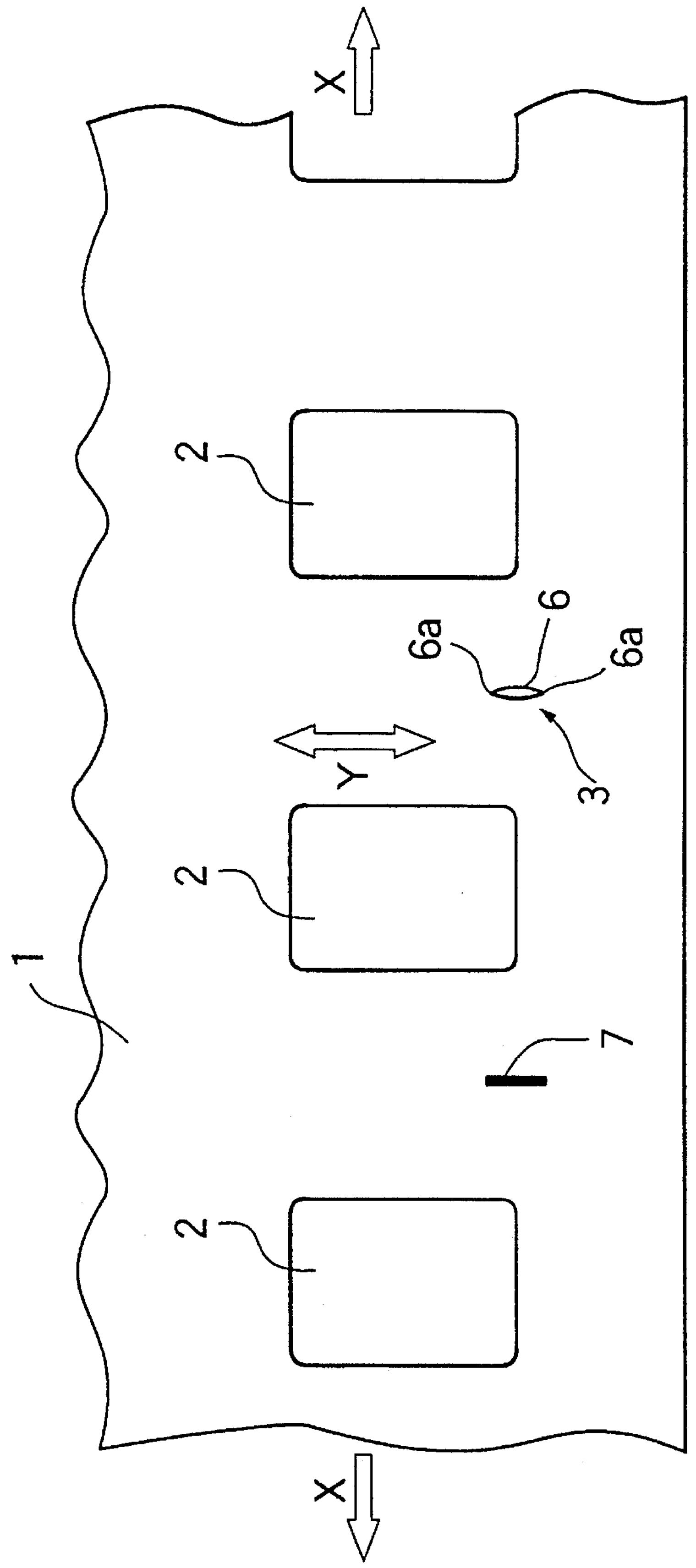
FIG. 3 is a top plan view illustrating still another embodiment in accordance with the invention.

The high tensile strength film 1 is provided between the adjacent perforations with a small aperture 3. The aperture 3 has at least one apex having an acute angle. The apex is directed toward a film-widthwise direction namely a direction indicated by "Y" in FIG. 1. The aperture 3 may be form in any form, typically in a rhombus 4 as illustrated in FIG. 1, an isosceles triangle 5 having an acute angle as illustrated in FIG. 2, or a combination of circular arcs 6 as illustrated in FIG. 3. The aperture 3 has an apex **4*a*, 5*a* or 6*a* having an acute angle, and the apexes 4*a*, 5*a*, 6*a* are directed toward a film-widthwise direction, namely the direction indicated by "Y". Since these apexes 4*a*, 5*a*, 6*a* are directed toward a film-widthwise direction, when the high tensile strength film 1 receives high tensile strength, the tear of the film 1 starts at the acute-angled apexes 4*a*, 5*a*, 6*a* and extends in the film-widthwise direction without the film 1** being stretched in the film-lengthwise direction, namely the direction indicated by "X".

The acute angle of the apexes **4*a*, 5*a*, 6*a* may range within 0 to 60 degrees. It should be noted that the aperture 3 may be replaced with a linear slit 7 as illustrated in FIG. 3. The slit 7** is equivalent to a case where the acute angle of the apex is equal to zero (0).

If the film 1 is provided at both edges extending in film-lengthwise direction with the perforations 2, the apertures 3 may be arranged between the adjacent perforations 2 at the both edges of the film 1. It should be noted that the aperture 3 formed on only one of the film-lengthwise extending edges of the film 1 is sufficient to induce the occurrence of tear of the film 1.

Though one aperture 3 may be formed between every adjacent perforation 2, one aperture 3 may be formed between every four perforations 2 because four perforations 2 correspond to one image-area in which images are input.

If the aperture 3 is located too near the perforations 2, the tear of the film 1 starting at the aperture 3 may run into the perforations 2, so that the film 1 may not be entirely torn. To prevent this, the aperture 3 is arranged to be located within a mesh area T illustrated in FIG. 4.

The area T is located at the center between the adjacent perforations 2. The area T has width $T_1$ in the film-lengthwise direction preferably in the range of 0 to 1.5 millimeters, more preferably in the range of 0.2 to 1.0 millimeters. It should be noted that width $T_1$ of zero (0) millimeters is equivalent to the formation of the linear slit 7 illustrated in FIG. 3. The linear slit 7 is effective as one of the apertures 3.

Figure 4:
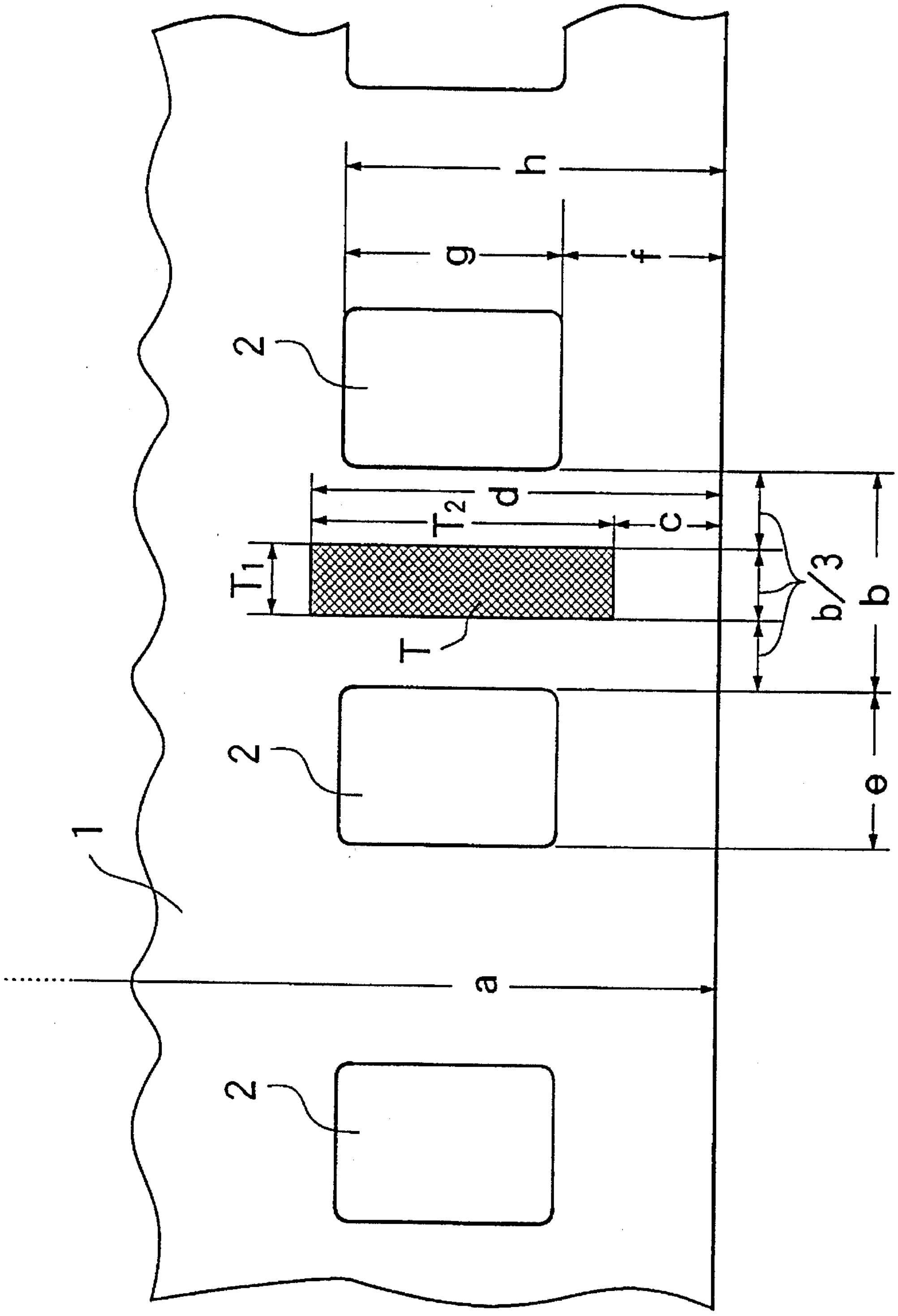
FIG. 4 illustrates an area in which the apertures are to be formed.

As illustrated in FIG. 4, in this embodiment, the width $T_1$ of the area T is equal to length "b/3" where "b" is an interval length between the adjacent perforations 2, and is located at the center between the adjacent perforations 2.

The length $T_2$ in the film-widthwise direction is in the range of 0.4% to 15% of the film width "a". Namely, the length $T_2$ is represented as follows.

$$T_2 = d - c$$

$$d = a \times 15/100$$

$$c = a \times 0.4/100$$

The length $T_2$ of the area T is preferably in the range of 1% to 15% of the film width "a".

$$T_2 = d - c$$

$$d = a \times 15/100$$

$$c = a \times 1/100$$

The film 1 illustrated in FIG. 4 has specific dimensions represented in millimeters as follows.

Film width denoted by "a"=35

Interval between the adjacent perforations denoted by "b"=2.77.

Shortest distance between the area T and the edge of the film denoted by "c"=0.14

Longest distance between the area T and the edge of the film denoted by "d"=5.25

Length of the perforation in the film-lengthwise direction denoted by "e"=1.98

Distance between the perforations and the edge of the film denoted by "f"=2.01

Length of the perforation in the film-widthwise direction denoted by "g"=2.80

Distance between the edge of the perforations remote from the edge of the film and the edge of the film denoted by "h"="f"+"g"=4.81

Length of the area T in the film-lengthwise direction denoted by "$T_1$"=b/3=0.92

Length of the area T in the film-widthwise direction denoted by "$T_2$"=d–c=3.85

Figure 5:
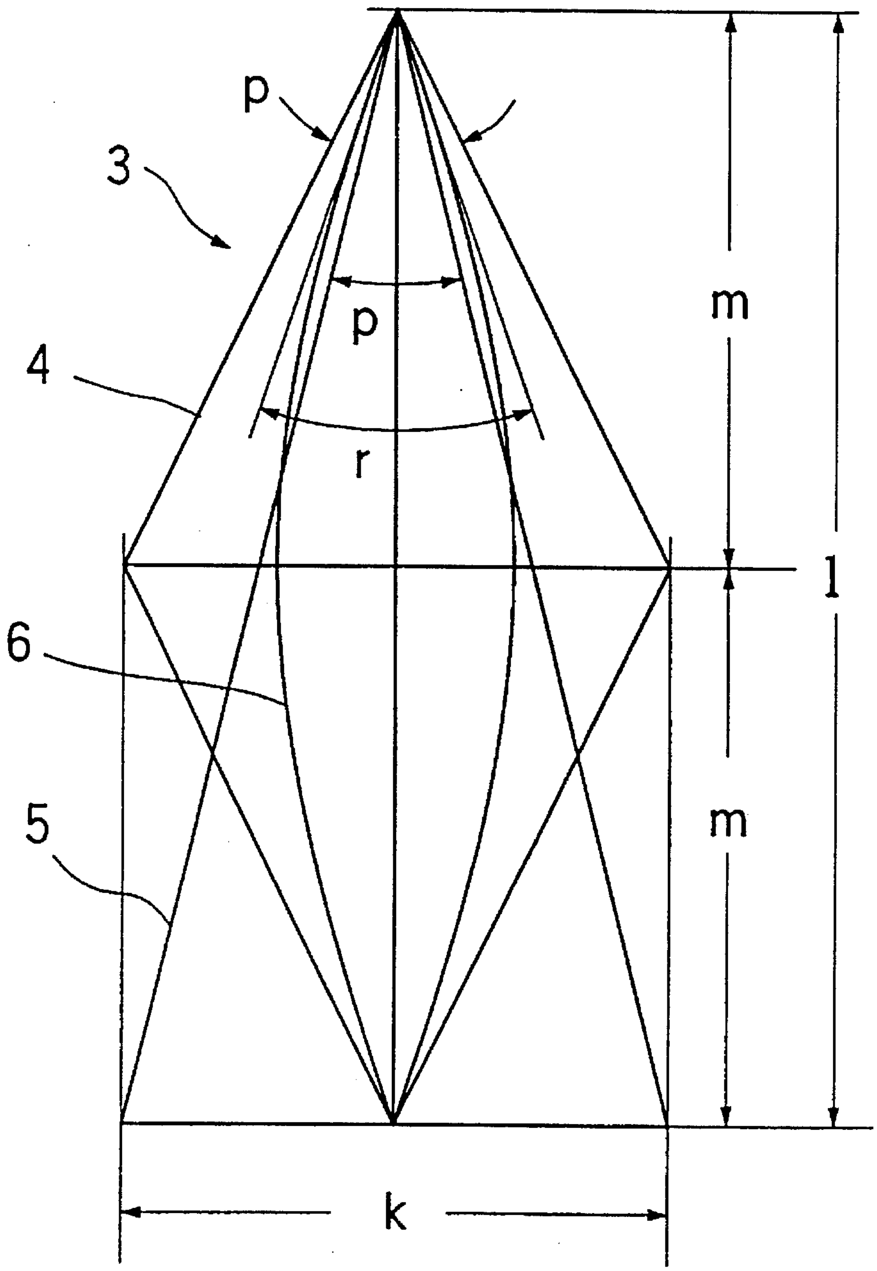
FIG. 5 illustrates various types of the aperture.

FIG. 5 shows specific dimensions of the aperture 3 in the forms of the rhombus 4, the acute-angled isosceles triangle 5 or the combination of circular arcs 6 when the aperture 3 would be formed on a film having 35 millimeters width.

Length in the film-lengthwise direction denoted by "k"= 0.2 to 0.5 millimeters

Length in the film-widthwise direction denoted by "L"= 1.0 to 1.5 millimeters

Half length of the rhombus 4 and the combination of arcs 6 in the film-widthwise direction denoted by "m"=L/2 =0.5 to 0.75 millimeters An acute angle of the apex of the aperture denoted by "p"=0 to 60 degrees The linear slit 7 is equivalent to a case where an acute angle of the apex of the aperture 3 is zero (0) degree. For the combination of circular arcs 6, the acute angle denoted by "p" is replaced with an angle denoted by "r" which is made by tangential lines of the two arcs.

In a film having no perforations such as a film fed by pinch rollers, the apertures 3 or the slit 7 are arranged to be located within an area defined by the length $T_2$, namely an area defined by two longitudinal edges each of which is remote from the edge of the film 1 by the distance "c" and "d". The apertures 3 or the slits 7 may be formed not only at one edge of the film, but at both edges of the film.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A high tensile strength film having a longitudinal direction and a transverse direction which is perpendicular to said longitudinal direction, said film further having opposite edges extending in said longitudinal direction, and said film comprising, a series of perforations formed along at least one of said longitudinally extending edges and spaced apart from each other for engagement with a means for feeding said film;

a means for initiating tearing of said film in said transverse direction under a longitudinally directed tensile force exceeding a predetermined value, said initiating means including at least one small aperture formed in said film between two adjacent perforations of said series of perforations, said aperture having at least one apex of an acute angle directed toward said transverse direction of the film;

wherein said film has a thickness between 10 and 200 micrometers and is made of a material selected from the group consisting of polyester, polyamide and polycarbonate;

wherein said small aperture is in the form of a diamond shape or a crescent shape and has a pair of apexes of acute angle directed oppositely from each other in said transverse direction of the film.

2. A high tensile strength film in accordance with claim 1, wherein said film has a thickness between 10 and 200 micrometers and is made of a material selected from the group consisting of polyester, polyamide and polycarbonate.

3. A high tensile strength film in accordance with claim 1, wherein said film has a thickness between 10 and 200 micrometers and is made of a material selected from the group consisting of polyester, polyamide and polycarbonate.

4. A high tensile strength film in accordance with claim 1, wherein said acute angle of said aperture is not greater than 60°.

5. A high tensile strength film in accordance with claim 1, wherein said aperture is formed in an area having a width in said longitudinal direction substantially equal to ⅓ of a spacing between two adjacent perforations, said area being spaced apart from an adjacent edge of each of said adjacent perforations by ⅓ of said spacing between said two adjacent perforations.

6. A high tensile strength film in accordance with claim 5, wherein said area has a length in said transverse direction of 0.4% to 15% of a width of said film measured in said transverse direction.

7. A high tensile strength film in accordance with claim 6, wherein said area has an edge which is spaced from an adjacent one of said longitudinally extending edge of said film by approximately 0.4% of said width of said film.

8. A high tensile strength film in accordance with claim 1, wherein said small aperture is in the form of a diamond shape.

9. A high tensile strength film in accordance with claim 1, wherein said small aperture is in the form of a crescent shape.

* * * * *